United States Patent [19]

Patterson

[11] Patent Number: 5,007,195
[45] Date of Patent: Apr. 16, 1991

[54] WEEDLESS FISHING HOOK AND LURE

[76] Inventor: James A. Patterson, 2074 20th St., Sarasota, Fla. 34236

[21] Appl. No.: 504,343

[22] Filed: Apr. 3, 1990

[51] Int. Cl.$^5$ .............................................. A01K 85/00
[52] U.S. Cl. ................................... 43/42.43; 43/42.4; 43/43.6; 43/43.4
[58] Field of Search .................. 43/42.4, 42.42, 42.43, 43/43.2, 43.4, 43.6

[56] References Cited

U.S. PATENT DOCUMENTS

| | | | |
|---|---|---|---|
| 2,482,881 | 9/1949 | Sonner | 43/43.4 |
| 2,522,292 | 9/1950 | Modesto | 43/43.4 |
| 2,623,321 | 12/1952 | Braukus | 43/43.4 |
| 2,932,114 | 4/1960 | Meucci | 43/43.6 |
| 3,274,726 | 9/1966 | Oney | 43/43.6 |
| 3,492,752 | 2/1970 | Viveiros | 43/43.4 |
| 3,670,446 | 6/1972 | Wheeler | 43/42.43 |
| 4,312,148 | 1/1982 | Hardwicke | 43/42.4 |
| 4,674,225 | 6/1987 | Webb | 43/43.4 |
| 4,793,090 | 12/1988 | Cooper | 43/42.43 |
| 4,796,378 | 1/1989 | Krueger | 43/43.2 |

Primary Examiner—Kurt Rowan
Attorney, Agent, or Firm—Charles J. Prescott

[57] ABSTRACT

A weedless fish hook comprising a conventional fish hook having a shank with a hooking end and an eyelet end and a length of thin, flexible pliable and pierceable tubing. One end of the tubing is snugly fitted over the hooking end of the fish hook so as to protectively conceal the tip and barb until ready for use. The other end of the tubing may be inserted through the eyelet and trimmed to a suitable length when ready for use. To expose the tip, the tubing is manually flexed between the eyelet and the tip of the hook toward the shank. To insure exposure of the barb, the user need only slide the tubing prior to piercing the tip through the side wall of the tubing. A weedless treble hook and a lure having either form of the weedless hook are also disclosed and claimed. The tubing may also be internally lubricated for further corrosive resistance for the hooking end.

6 Claims, 1 Drawing Sheet

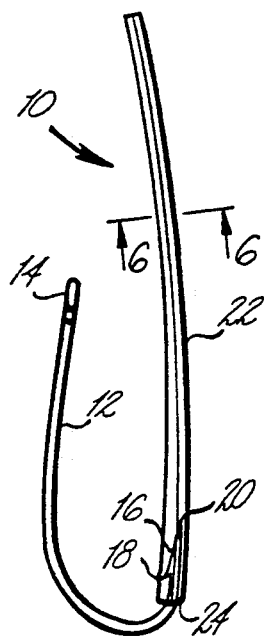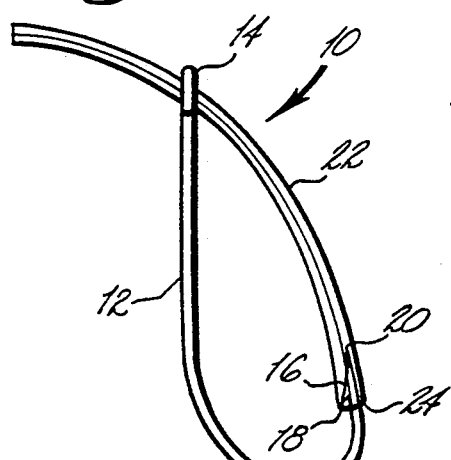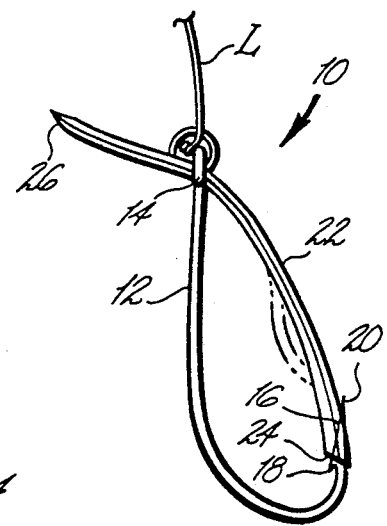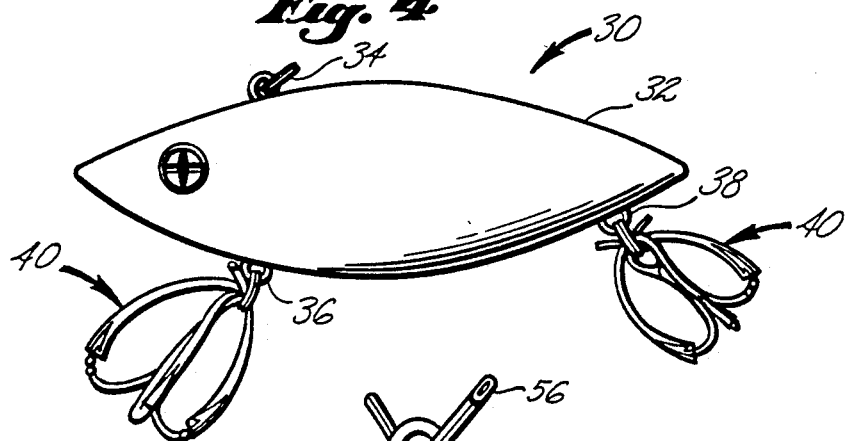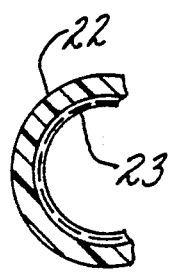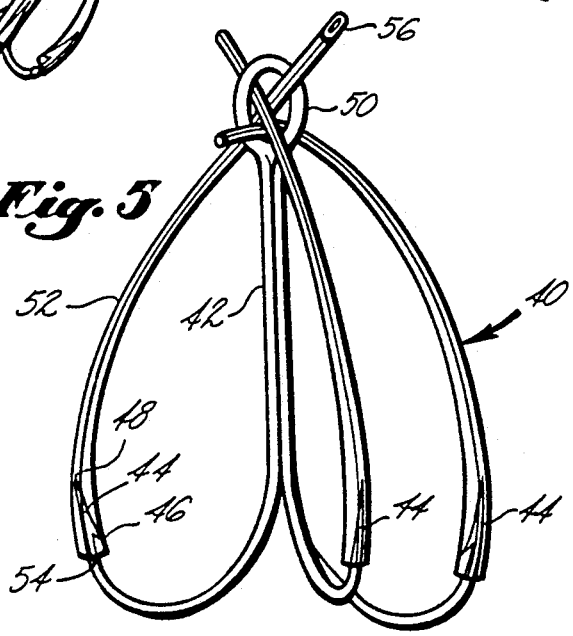

WEEDLESS FISHING HOOK AND LURE

BACKGROUND OF THE INVENTION

This invention relates generally to fishing accessories, and more particularly to a weedless fishing hook and lure.

Protecting the hooking end of a fishing hook until ready for use has been accomplished in a variety of ways. Such common objects as corks, rubber bands, plastic bags and the like are typically used for this purpose by embedding or partially covering the tip of the hook. In salt water, the further problem of protecting and preventing rust and corrosion from forming on the hooking end is also dealt with in many common ways.

There are also various forms of "unweedless" hooks one of which utilizes a thin flexible piece of spring wire between the eyelet or shank and the hooking end spring biased in place so that, when a fish strikes, the wire will deflect away from the hooking end to expose it to catch the fish. However, such devices known to applicant typically corrode or otherwise loose their effectiveness even while lying in the fishing tackle box and are thus many times totally ineffective when selected for use. The present invention provides a weedless fishing hook and lure arrangement having either a single or a treble hook embodying the invention connected thereto which not only provides the "weedless" feature, but also fully protects the hooking end of the weedless fish hook when not in use. Activating the invention when selected for use is a simple manual procedure requiring inward flexing of the piece of tubing connected over the hooking end and fitted through the eyelet of the fish hook.

BRIEF SUMMARY OF THE INVENTION

This invention is directed to a weedless fish hook comprising a conventional fish hook having a shank with a hooking end and an eyelet end and a length of thin, flexible pliable and pierceable tubing. One end of the tubing is snugly fitted over the hooking end of the fish hook so as to protectively conceal the tip and barb until ready for use. The other end of the tubing may be inserted through the eyelet and trimmed to a suitable length when ready for use. To expose the tip, the tubing is manually flexed between the eyelet and the tip of the hook toward the shank. To insure exposure of the barb, the user need only slide the tubing prior to piercing the tip through the side wall of the tubing. A weedless treble hook and a lure having either form of the weedless hook are also disclosed and claimed. The tubing may also be internally lubricated for further corrosion resistance.

It is therefore an object of this invention to provide a weedless fish hook whose hooking end is fully protected prior to use but may be easily activated for catching fish when placed into service.

It is another object of this invention to provide both single and treble hooks embodying this invention which are inherently more reliable and less expensive to manufacture than other known devices.

It is yet another object of this invention to provide a fishing lure having a weedless single or treble hook operably connected thereto which includes the above structural features.

In accordance with these and other objects which will become apparent hereinafter, the instant invention will now be described with reference to the accompanying drawings.

BRIEF DESCRIPTION OF THE DRAWINGS

FIG. 1 is a side elevation view of one embodiment of the invention prior to use.

FIG. 2 is a side elevation view of FIG. 1 showing the flexible tubing having been inserted through the eyelet of the fish hook.

FIG. 3 is a side elevation view of FIG. 2 after the flexible tubing has been trimmed to length and the eyelet has been connected to a length of fishing line.

FIG. 4 is a side elevation view of a fishing lure including a weedless treble hook embodiment of the invention.

FIG. 5 is a perspective view of another embodiment of the invention as applied to a treble hook as shown in FIG. 4.

FIG. 6 is a section view in the direction of arrows 6—6 in FIG. 1.

DETAILED DESCRIPTION OF THE INVENTION

Referring now to the drawings, and particularly to FIGS. 1 to 3, one embodiment of the invention is shown generally at numeral 10. This weedless fish hook 10 includes a conventional barbed fish hook having a shank 12 with an eyelet 14 at one end and a hooking end 16 at the other end. The hooking end 16 includes a barb 18 and a sharp point or tip 20 for hooking fish. The eyelet 14 is a formed closed loop used for connecting the hook to a fishing line or lure.

Also included in the weedless fish hook 10 is a length of flexible, pliable, pierceable tubing 22 which is snugly fitted at one end over the hooking end 16 as shown so that tubing end 24 is at least to, and may be beyond, the barb 18 as shown in FIG. 1. Until ready for use, the weedless fish hook 10 is preferably left in the configuration shown in FIG. 1.

The preferred material for making the length of tubing 22 is a hollow fiber material of either polyethelyne, celulose acetate, Teflon, Nylon, polyvinyl chloride, and other extrudable polymers. A thermal plastic form of these materials is preferred. Typical extrusions used have included an o.d. of 0.022, 2.094" with an i.d. of 0.036 to 0.056". Wall thickness ranged from 0.010 to 0.012".

When ready for use, the tubing 22 is inserted through eyelet 14 as shown in FIG. 2. If the lower end 24 of tubing 22 has been slid beyond barb 18, at this point the user may slightly disengage the tubing 22 from hooking end 16 so that barb 18 is exposed a desired amount beyond tubing end 24 while still retaining a secure grip on the majority of hooking end 16.

Referring additionally to FIG. 3, to expose the concealed barb 20 for use, the user need only manually flex tubing 22 toward shank 12 as shown in phantom. This flexing of the tubing 22 between the tip 20 and eyelet 14 causes the sharp tip to pierce through the thin side wall of tubing 22 so as to operably expose tip 20 for use. The user may also trim the upper end 26 of tubing 22 to the desired length. Additionally, the fishing line L may also be secured to eyelet 14 as desired.

Thus, in a configuration of the invention 10 shown in FIG. 3, the hooking end 16 is substantially fully protected by tubing 22 from collecting weeds while being pulled through the water during normal fishing action.

However, because tip 20 and barb 18 are exposed, nonetheless full fish hooking action is maintained.

To further enhance the protectability and corrosion resistive features of this invention, tubing 22 may be coated or partially filled with a very light oil 23 as seen in FIG. 6 such as WD-40 or other types of anti-oxidant oils. The presence of this oil 23 in no way detracts from the overall functioning of this invention 10.

Referring to FIGS. 4 and 5, a lure having a treble hook embodiment of the invention is shown generally at numeral 30. This fishing lure includes a lure body 32 having an eyelet 34 provided for interconnection to a fishing line. Eyelets 36 and 38 secured within body 32 are also provided which are connected to the eyelet 50 of a weedless treble hook shown generally at numeral 40.

The treble hook 40, as best seen in FIG. 5, includes a common main shank 42 which is formed of the three shanks of each fishing hook which have been mechanically welded or soldered together by conventional means. Three hooking ends 44 are provided, each at a radial spaced angle of 120 degrees to one another in the plan view in the conventional manner. Each hooking end 44 includes a sharp point or tip 48 and a barb 46 disposed slightly from tip 48.

Each hooking end 44 is protectively concealed within the lower end portion of a flexible, pliable, pierceable length of tubing 52 which is slid at its lower end 54 sufficiently over hooking end 44 so as to protectively conceal both barb 46 and point 48. The other end 56 of each length of flexible tubing 52 has been inserted through eyelet 50 and trimmed to length as previously described. As shown in FIG. 5, tips 48 have not been pierced through the side wall of tubing 52 as previously described in FIG. 3. Thus, to activate this weedless treble hook 40, the user simply needs to slightly remove the lower end 54 of tubing 52 so as to expose barb 46 and then to flex the main portion of tubing 52 toward shank 42 to effect the piercing of tip 48 through the side wall of tubing 52 as previously described in FIG. 3.

Although not shown, the use of the single hook embodiment of the invention shown in FIG. 1 may easily be adapted and connected to a fishing lure body 32 similar to that shown in FIG. 3 or one similar thereto, in place of the weedless treble hook 40.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A weedless-type fish hook comprising:
   a conventional fish hook having a shank with a hooking end and an eyelet end;
   said hooking end having a sharp distal tip and a barb spaced from said tip;
   a continuous, uncut and unpierced length of very thin, flexible, pliable, pierceable entirely hollow tubing, one end of which is securely fitted over said hooking end to protectively conceal said tip and said barb within said tubing, the other free end of said tubing being slidably insertable through said eyelet end;
   said tip piercing through and extending outside said tubing and exposed for use when said tubing is manually flexed by hand between said tip and said eyelet end toward said shank prior to use.

2. A weedless-type fish hook as set forth in claim 1, wherein:
   said weedless fish hook is operably connected to a fishing lure body.

3. A weedless-type fish hook comprising:
   a conventional fish hook having a shank with a hooking end and an eyelet end;
   said hooking end having a sharp distal tip and a barb spaced from said tip;
   a length of very thin, flexible, pliable pierceable entirely hollow tubing, one end of which is securely fitted over said hooking end to protectively conceal said tip and said barb within said tubing, the other free end of said tubing being slidably insertable through said eyelet end;
   said tip piercing through said tubing and exposed for use when said tubing is manually flexed by hand between said tip and said eyelet end toward said shank prior to use;
   said tubing is internally lubricated.

4. A weedless-type treble fish hook comprising:
   three fish hooks each having connected, coextending shanks each with a hooking end and a common eyelet end;
   each said hooking end having a sharp distal tip and a barb spaced from said tip;
   a continuous, uncut and unpierced length of very thin, flexible, pliable, pierceable entirely hollow tubing, one end of which is securely fitted over each said hooking end so as to conceal each said tip and each said barb within one said tubing, the other free end of each said tubing being slidably insertable through said eyelet end;
   each said tip piercing through and extending outside the corresponding said tubing and exposing each said tip for use when said tubing is manually flexed by hand between said tip and said eyelet end toward said shanks prior to use.

5. A weedless-type treble fish hook as set forth in claim 3, wherein:
   said weedless-type treble fish hook is operably connected to a fishing lure body.

6. A weedless-type fish hook comprising:
   three fish hooks each having connected, coextending shanks each with a hooking end and a common eyelet end;
   each said hooking end having a sharp distal tip and a barb spaced from said tip;
   a length of very thin, flexible, pliable, pierceable entirely hollow tubing, one end of which is securely fitted over each said hooking end so as to conceal each said tip and each said barb within one said tubing, the other free end of each said tubing being slidably insertable through said eyelet end;
   each said tip piercing through the corresponding said tubing and exposing each said tip for use when said tubing is manually flexed by hand between said tip and said eyelet end toward said shanks prior to use;
   said tubing is internally lubricated.

* * * * *